No. 792,459. PATENTED JUNE 13, 1905.
F. R. RICHARDS.
FRUIT OR VEGETABLE CUTTER.
APPLICATION FILED NOV. 12, 1904.
2 SHEETS—SHEET 1.
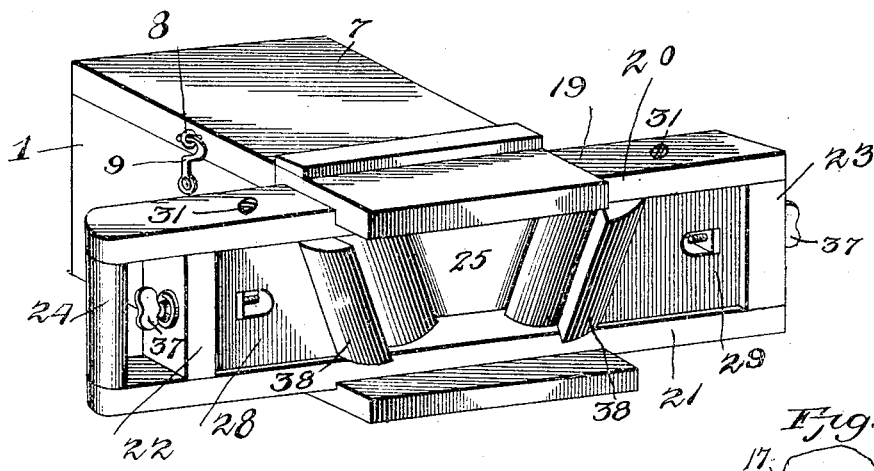
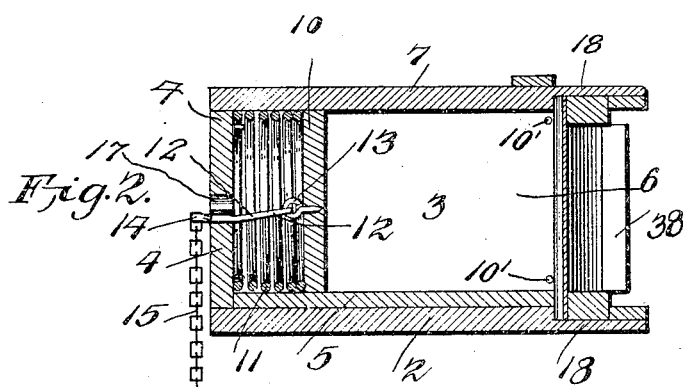
Inventor
F. R. Richards.
Witnesses
Frank W. Hough
C. C. Hines
By Victor J. Evans
Attorney No. 792,459. PATENTED JUNE 13, 1905.
F. R. RICHARDS.
FRUIT OR VEGETABLE CUTTER.
APPLICATION FILED NOV. 12, 1904.
2 SHEETS—SHEET 2.
Fig. 4.
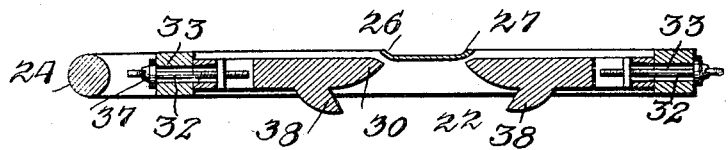
Fig. 5.
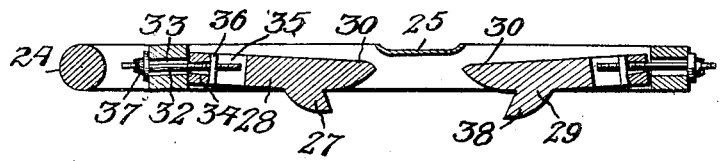
Fig. 6.
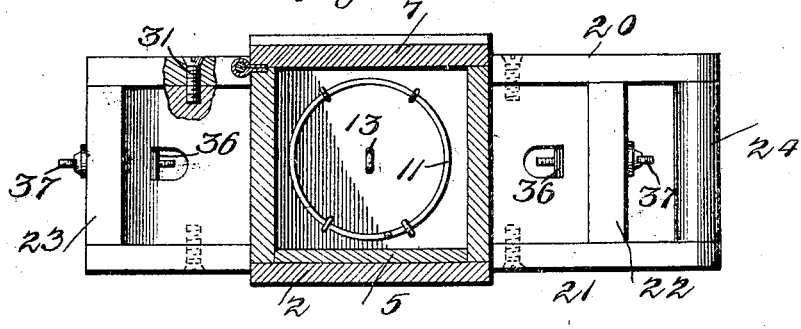
Fig. 7.  Fig. 8.
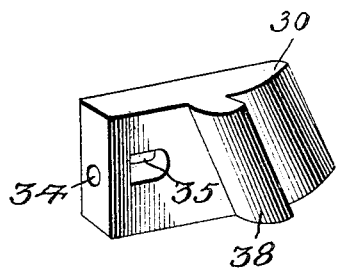
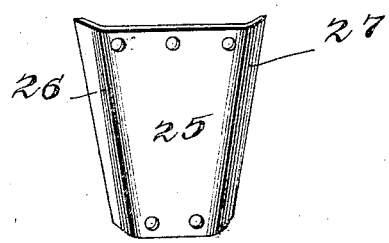
Witnesses
Frank N. Hough
C. C. Hines
Inventor
F. R. Richards.
By Victor J. Evans
Attorney No. 792,459.  
Patented June 13, 1905.

UNITED STATES PATENT OFFICE.

FRANK R. RICHARDS, OF SABETHA, KANSAS.

FRUIT OR VEGETABLE CUTTER.

SPECIFICATION forming part of Letters Patent No. 792,459, dated June 13, 1905.

Application filed November 12, 1904. Serial No. 232,541.

*To all whom it may concern:*

Be it known that I, FRANK R. RICHARDS, a citizen of the United States, residing at Sabetha, in the county of Nemeha and State of Kansas, have invented new and useful Improvements in Fruit or Vegetable Cutters, of which the following is a specification.

This invention relates to fruit and vegetable cutters and slicers of that type employing a spring-actuated follower and a reciprocating cutter, the object of the invention being to provide a device of this character which is simple of construction, comparatively inexpensive of production, efficient in use for cutting or slicing fruits or vegetables of various kinds, and which embodies improved features increasing the general efficiency of this class of devices.

With this and other objects in view the invention consists of the features of construction, combination, and arrangement of parts hereinafter fully described and claimed, reference being had to the accompanying drawings, in which—

Figure 1 is a perspective view of a fruit or vegetable cutter and slicer embodying my invention. Fig. 2 is a vertical longitudinal section of the same, showing the follower locked in retracted position. Fig. 3 is a view similar to Fig. 2, the reciprocating cutter being removed and the follower shown forced to the limit of its forward movement by its actuating-spring. Figs. 4 and 5 are longitudinal horizontal sectional views through the reciprocating cutter, showing the gages adjusted to cut the material into slices of different thicknesses. Fig. 6 is a vertical transverse section through the casing looking in forward direction toward the reciprocating cutter, showing the latter in working position. Fig. 7 is detail view of one of the gage-pieces. Fig. 8 is a similar view of the cutter-plate. Fig. 9 is a fragmentary elevational view of the rear wall of the casing, showing the keyhole-slot and the follower-retracting means.

Referring now more particularly to the drawings, the numeral 1 represents the casing or receptacle of the improved cutter and slicer, which is preferably of oblong rectangular form and comprises a bottom 2, side walls 3, and a rear end wall 4, a supplemental bottom 5 being arranged upon the bottom 2 and forming the base of the follower-chamber 6, in which the fruit or vegetable to be cut is placed to be forced forward to the cutting device. The receptacle is provided with a hinged top or cover 7, which may be held closed by any preferred form of fastener, the cover being provided in the present instance for this purpose with a screw-eye 8, adapted to be engaged by a hooked catch 9 on one of the sides 3 to hold it closed.

In the chamber 6 is a follower 10, adapted to be forced forward by a coiled expansion-spring 11, the said spring being secured at its forward end to the follower and at its rear end to the rear wall 4 of the casing. The follower is limited in its forward movement by stop-pins 10' and may be retracted to permit the fruit or vegetable to be cut or sliced to be fed down into the chamber 6 in advance thereof, and for this purpose it is provided with a retracting attachment comprising a rod or link 12, pivotally connected at its forward end to an eye 13 on the back of the follower and provided at its rear end with an eye or enlargement 14, to which is secured one end of a retracting-chain 15, the opposite end of which carries a ring or handpiece 16, by which it may be grasped to pull rearwardly upon the retracting connection and draw the follower backward. The chain and rod 12 are adapted to have movement through a keyhole-slot 17, formed in the rear wall 4 of the casing, the enlarged portion of the slot permitting the rear end of the rod or link to pass therethrough to the exterior and the reduced portion of the slot being of less transverse area than the eye or projection 14 on the rear end of said rod, whereby when the follower is retracted to its fullest extent the rear end of the rod or link may be dropped down into the reduced portion of the slot, so that the eye or enlargement 14 will project across the same and bear upon the rear wall 4 to lock the follower against forward movement. The fruit or vegetable to be sliced may then be conveniently placed in position within the chamber 6 to be fed forward to the cutter by opening the hinged door or top 7 and inserting the fruit or vegetable into the chamber in advance of the follower, after which the follower may be released by swinging the rod or link 12 upward until the projection 14 comes in line with the upper enlarged portion of the hole 17, whereupon the spring 11 will be free to draw the retracting device through the opening and project the follower forward.

The casing is provided at its front end with forwardly-projecting guides 18 to receive a reciprocating cutter 19, which is disposed and arranged for movement transversely to operate upon the fruit or vegetable forced through the open front end of the casing by the follower. This cutter consists of an oblong rectangular frame comprising upper and lower longitudinal bars 20 and 21, connected by end bars 22 and 23, the end bar 22 being arranged a suitable distance inside of the adjacent ends of the top and bottom bars to form a space for the reception of a handle or grip-piece 24, by which the cutter may be conveniently reciprocated.

Extending vertically between the rear edges of the bars 20 and 21 at the center of the cutter-frame is a cutter-plate 25, which is of truncated triangular form, as clearly shown in Fig. 8, and is fitted and secured at its upper and lower edges in recesses in the rear edges of the bars. The sides of this plate are bent upwardly and rearwardly at an oblique angle to the body of the plate and their edges reduced to form cutting-blades 26 and 27, which when the cutter-frame is reciprocated act alternately to slice or cut the fruit or vegetable forced forward by the follower. Disposed between bars 20 and 21 at the opposite ends of the cutter-frame are gage-pieces 27 and 29, having their inner ends or edges 30 arranged in juxtaposition or working relation to the cutting-blades 26 and 27 and suitably spaced therefrom to form outlets for the cut fruit or vegetable. Each of these gage-pieces is pivotally mounted in the cutter-frame upon screws or other suitable pivotal pieces 31, passing through the bars 20 and 21, so that they may be swung at right angles to the cutter-frame to adjust their free edges 30 relative to the cutting-blades 26 and 27, to increase or diminish the eduction spaces or outlets, to adapt the cutter to cut coarse or fine, as occasion requires, and to cut the fruit or vegetable into slices of different thicknesses. In order to secure the gage-piece in adjusted position, a fastening-screw 32 is provided, which extends through an opening 33 in the adjacent end bar 22 or 23 and through an opening 34 in the outer end of the gage-piece, which opening 34 communicates at its inner end with a transverse slot 35 in the gage-piece, which slot receives the inner threaded end of the screw and a securing-nut 36, which latter is held from rotation in said slot and serves, when the screw is adjusted in one direction or other, to free the gage-piece and permit it to swing to a determined extent or to clamp the same firmly in adjusted position. The outer end of the screw is provided with a head or finger piece 37, which bears against the outer side of the end bars 22 or 23 and coöperates with a nut 36 to clamp the gage-piece when the screw is tightened up. The opening or passage 34 in the gage-piece exceeds in diameter the stem of the screw or is made flaring, so as to permit the gage-piece to swing when the screw is loosened with a minimum of resistence. The inclination of the cutting-blades 26 and 27 and their angular disposition facilitates the cutting or slicing of a fruit or vegetable, as the blades are projected sufficiently to positively engage the body of the substance as it is fed forward and to exert a draw cut thereon, as will be readily understood. The free edges 30 of the gage-pieces are inclined upwardly in reverse direction to correspond to the form of the cutter-plate and to form a throat or discharge-passage which permits the cuttings to have free discharge. Each gage-piece is formed or provided with a correspondingly-inclined guard or projection 38, which prevents the cuttings from flying outwardly and becoming scattered and which further serves as a finger-piece by which the gage-piece may be conveniently adjusted.

From the foregoing description, taken in connection with the accompanying drawings, the construction and mode of operation of my improved fruit and vegetable slicer and cutter will be readily understood, and it will be seen that it provides a simple, cheap, and efficient device in which the follower may be readily locked against movement to permit of the insertion of the fruits or vegetables to be cut and in which the cutting mechanism is adjustable to obtain a nicety of cutting action to enable the fruit or vegetable to be cut coarse or fine, as desired, or severed into slices of different thicknesses.

Changes in the form, proportions, and minor details of construction may be made within the scope of the invention without departing from the spirit or sacrificing any of the advantages thereof.

Having thus described the invention, what is claimed as new is—

1. In a device of the character described, the combination with a casing having a slot provided with a reduced portion, of a spring-actuated follower, a link connected to the follower and adapted to project through said slot and provided with an enlargement adapted to engage the wall of the casing when the link is disposed in the reduced portion of the slot to lock the follower against forward movement, and a flexible operating connection attached to the link.

2. In a device of the character described, a reciprocating cutter comprising a frame, a cutter-blade carried by said frame, a gage pivoted to the frame and having a gaging edge movable toward and from the cutter and formed with an opening extending longitudinally through its opposite edge and a transverse slot communicating with said opening, a fastening-screw journaled within the frame and having its threaded stem extending through the opening in the gage-piece and entering the slot, a nut in said slot and engaging the threaded end of the stem, and means for manipulating said screw.

3. In a device of the class described, a reciprocating cutter comprising a frame, a truncated triangular cutting-plate mounted in said frame, the sides of said cutting-plate being bent at an angle and forming cutting edges, pivoted gage-pieces adjustable toward and from said cutting edges, and means for securing the gage-pieces in adjusted position.

In testimony whereof I affix my signature in presence of two witnesses.

FRANK R. RICHARDS.

Witnesses:
J. C. LICHTER,
J. M. DENTON.